Patented June 3, 1930

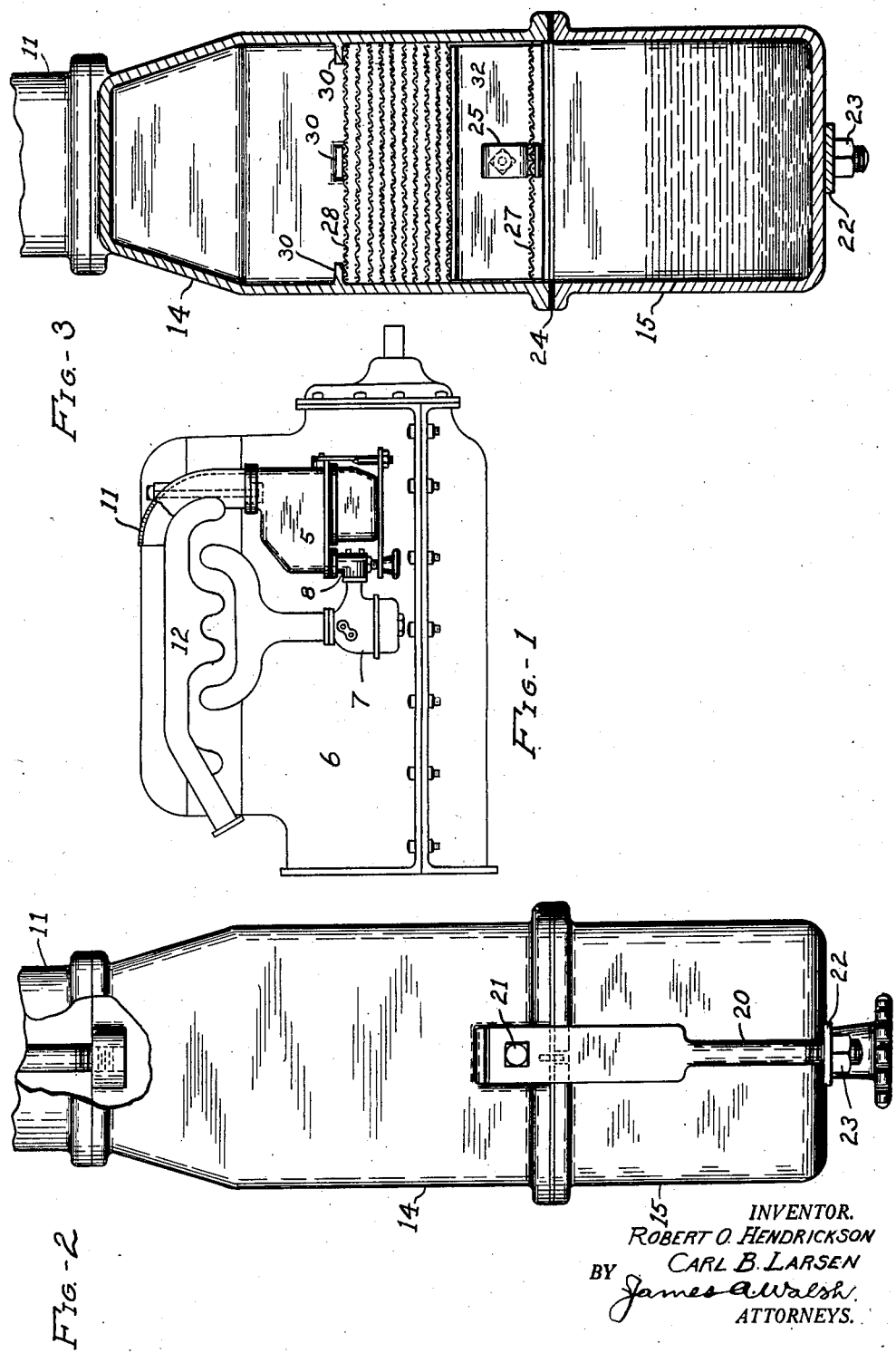

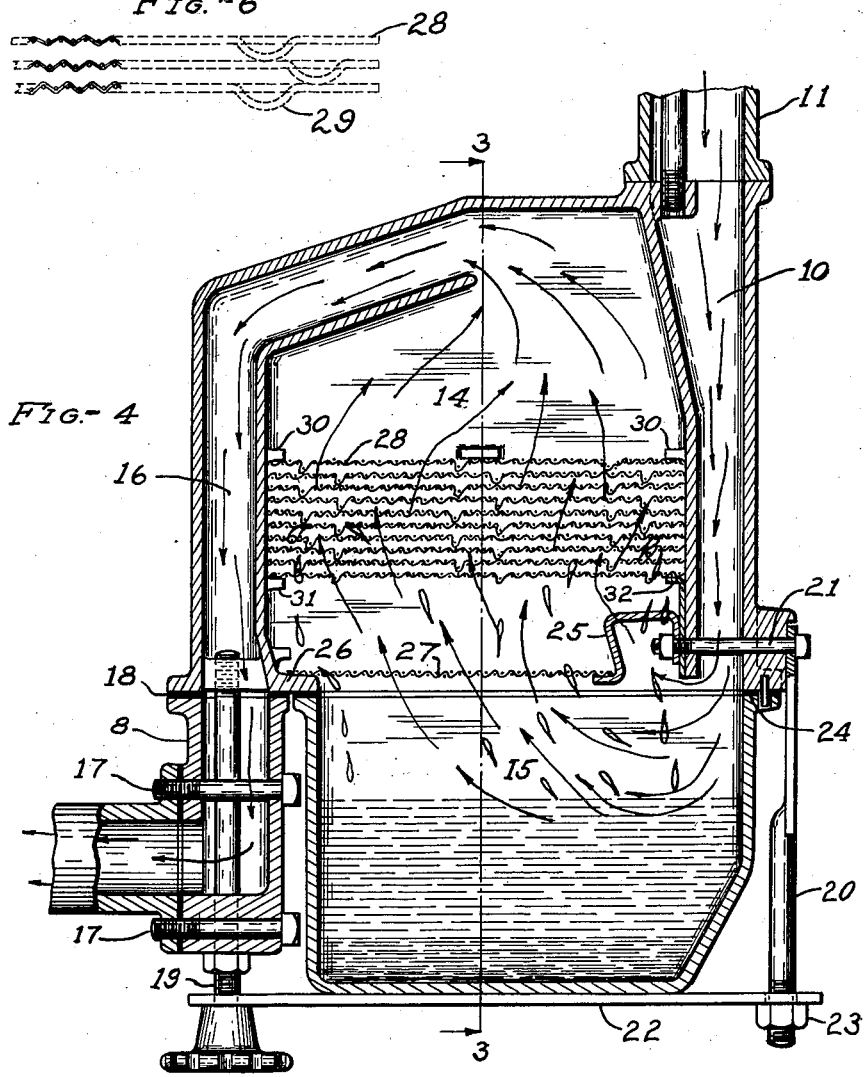

1,761,014

UNITED STATES PATENT OFFICE

ROBERT O. HENDRICKSON AND CARL B. LARSEN, OF RACINE, WISCONSIN, ASSIGNORS TO J. I. CASE COMPANY, OF RACINE, WISCONSIN, A CORPORATION

AIR CLEANER FOR INTERNAL-COMBUSTION ENGINES

Application filed March 30, 1928. Serial No. 266,052.

In the employment of air cleaners in connection with the carburetors and engines of self-propelled vehicles, such for example as tractors, which are to a large extent operated under conditions where the atmospheric air is laden with foreign matter detrimental to the elements stated, considerable difficulty has been experienced in successfully cleaning and washing the air and freeing the same from dust, grit, insects, flying débris which exists about thrashing and agricultural machines in operation, road building, and in many other circumstances; and our object is to provide a comparatively simple and effective device attachable to carburetors which accomplishes a maximum washing and cleaning of the air before its admission into the carburetor and which is so constructed and assembled that a thorough separation of extraneous matter from the air is assured, and also that the device itself may be readily cleansed and replenished with oil as conditions require.

In the accompanying drawings, forming part hereof, Figure 1 is a side elevation of an engine equipped with my improvement; Fig. 2, an end elevation of the device; Fig. 3, a vertical section as seen when looking in the direction indicated by the arrows 3—3 in Fig. 4; Fig. 4, a transverse vertical section through the device; Fig. 5, an under side plan showing means for fastening the lower to the upper section of the device; and Fig. 6 is an enlarged detail of the strainer which we employ.

As indicated in Fig. 1, our improved air cleaner, 5, is mounted upon an engine, 6, and is connected to a carburetor, 7, by an adapter, 8, designed to be positioned to connect carburetor inlets at different heights in relation to the cleaner.

The air cleaner 5 may be of any desired exterior formation, and comprises an inlet passage, 10, preferably flared, which may be provided with a heating intake, 11, positioned along the manifold, 12, so that air entering therein and drawn through the passage 10 by the action of the engine will be heated. The body of the cleaner is composed of the upper chamber, 14, and detachable oil containing compartment or sump, 15, the chamber 14 embodying a discharge passage, 16, which registers with the adapter 8, the latter in turn being connected to the carburetor 7 by bolts, at 17, or otherwise, a gasket, 18, being interposed between the jointed ends of the passage 16 and the adapter 8, as indicated in Fig. 4, and said latter two elements are connected by a screw-bolt, 19. The sump 15 is removably connected to the chamber 14 in any practical manner, a desirable means being a rod, 20, connected by a bolt, 21, passing into chamber 14 or through its inlet passage 10, said rod extending downwardly to be in turn connected to the screw-bolt 19 by a latch, 22, which fits under and supports the sump 15 and which may tightly bind the sump by means of the nut, 23, on rod 20, and in order to provide a close fitting joint between the chamber and sump we preferably interpose a gasket, 24, therebetween.

In the chamber 14 we provide a bracket or other supporting device, as 25, which may be secured in position by the bolt 21 or otherwise, and upon which bracket and a flange or projection, 26, in the chamber we place a reticulated oil breaker, 27, for a purpose to appear. In said chamber 14 we also install a strainer comprising superimposed sheets, 28, of wire meshing or the like, which sheets are preferably provided with depressions, 29, which constitute spacers for separating the sheets. These sheets are inserted and positioned against lugs, 30, or maintained by other devices, and may be supported by lugs, 31, and a flanged brace, 32, mounted upon the bolt 21, or in other manner. While we have specifically described a strainer comprising reticulated sheets it will be understood that any desired straining or filtering material may be employed for our purpose, but we have demonstrated in practice that an arrangement substantially of the character disclosed is highly practical and entirely satisfactory.

In operation, it will be understood that the sump has been supplied with oil, as indicated in Fig. 4, and, as the engine is in operation, the atmospheric air is withdrawn into the passes through the flared inlet passage 10, and violently strikes the oil, which impaction depresses its surface and splashes the oil in more or less globular formation, masses or spray, against the breaker 27, which breaks and separates such bodies, so that by the splashing action the oil is thrown upwardly into the strainer comprising the reticulated sheets referred to and arrests the progress of the oil which, with any foreign matter contained therein, clings to or is held in suspension from the wire meshing and drips therefrom through the breaker 27, and thence into the sump. The direction of the air is indicated by the arrows in Fig. 4, and it will be seen that in the inlet passage it is confined until it reaches the lower end thereof where it is abruptly deflected upwardly upon its impact with the oil in the sump. The coarse and heavy sediment and débris carried by the air becomes immersed when it strikes the oil body, and that portion of such material which is carried upwardly and which is of a character which will not pass through the breaker is arrested thereby and precipitated into the oil, so that only the very finest dust particles are carried by the oil in the form of mist to the strainer, and as there is a constant washing action in that element it will be understood that the commingled oil and dust intercepted by the meshed sheets continually drip therefrom, with the result that the air is thoroughly washed and complete defecation thereof has been accomplished when it passes from the strainer and is drawn through the discharge passage into the carburetor and thence to the engine. By the washing action disclosed the strainer parts are maintained in clean condition and the air freed from oil and dust when it enters the discharge passage; and we have demonstrated in practice and by scientific tests that our improved method produces the maximum clarification of air for the purpose stated, which is of extreme importance in the operation of internal combustion engines to protect them from impairment by gritty and unclean fuel and thereby materially prolonging their serviceability. It will thus be apparent that as the strainer and breaker in the chamber 14 are at all times maintained in clean condition by the washing and dripping process described it is unnecessary to remove or disturb such parts, as is common in the use of strainers in which we are aware the straining or filtering elements quickly collect and retain foreign matter which it is necessary to frequently eliminate by removing the straining material and cleaning the same with gasolene or otherwise; in fact, but slight attention is required where our improved cleaner is employed, as it is but necessary occasionally, when the sump 15 becomes charged with sediment and débris, to remove and empty the same, whereupon it may be replenished with oil and readily attached to the chamber 14 for cleaning air in the manner described, and we desire it to be understood that the employment of the breaker 27 is not always absolutely essential as the strainer sheets 28 will efficiently perform the separating and washing actions described, but in some conditions the use of the breaker is expedient for the purpose explained.

We claim as our invention:

1. An air cleaner, comprising a chamber, an air inlet passage communicating with the chamber, an air discharging passage communicating with the chamber, an oil containing sump detachably connected to the chamber, a strainer comprising superimposed reticulated sheets mounted in the chamber, means integral with said sheets for spacing the sheets from each other, and means for retaining the sheets within the chamber.

2. In an air cleaner, a chamber embodying air inlet and discharge passages, a strainer in the chamber, means connecting the discharge passage to a carburetor, a sump beneath the chamber, pivotal means mounted adjacent said connecting means and extending beneath the sump, and means detachably connecting said pivotal means to the chamber whereby said sump may be removed and replaced.

3. In an air cleaner, a chamber, a flared intake passage at one side of the chamber and communicating therewith, an air discharging passage at the opposite side of the chamber extending substantially horizontally from the chamber and downwardly alongside thereof, said intake and discharge passages being formed integrally with said chamber, a strainer in the chamber, and a sump detachably secured to the chamber and containing oil with which air from the inlet passage impacts and commingles and passes therefrom through said strainer and along the horizontal portion and thence along the downwardly extending portion of the discharge passage to a carburetor.

4. An air chamber comprising a body portion constituting a chamber, a wall within the chamber spaced from the body to form an air intake passage, a horizontally and downwardly extending wall in the opposite side of the chamber spaced from said body to form an air discharge passage, means positioned between said walls for cleansing air passing from said intake to the discharge passage, and means connected to the body and adapted to contain liquid against which air from the intake passage impacts and commingles during its passage through said cleansing means and into said discharge passage.

In testimony whereof we affix our signatures.

ROBERT O. HENDRICKSON.
CARL B. LARSEN.